United States Patent
Kamen et al.

(10) Patent No.: US 6,542,938 B1
(45) Date of Patent: Apr. 1, 2003

(54) MECHANISM AND APPARATUS FOR ADAPTIVE QUALITY PERFORMANCE CONTROL IN 3D BASED PC APPLICATIONS

(75) Inventors: Yakov Kamen, Cupertino, CA (US); Joe Rickson, San Bruno, CA (US); Leon Shirman, Redwood City, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/098,076

(22) Filed: Jun. 16, 1998

Related U.S. Application Data

(60) Provisional application No. 60/068,590, filed on Dec. 23, 1997.

(51) Int. Cl.[7] .............................................. G06F 9/46
(52) U.S. Cl. ........................................ 709/328; 707/526
(58) Field of Search .............................. 345/132, 326, 345/520, 531, 558; 707/103, 526; 709/310–400; 710/14, 261; 712/20, 39–43, 229

(56) References Cited

U.S. PATENT DOCUMENTS

| | | |
|---|---|---|
| 5,319,388 A | 6/1994 | Mattison et al. |
| 5,432,900 A | 7/1995 | Rhodes et al. |
| 5,438,663 A | 8/1995 | Matsumoto et al. |
| 5,473,342 A | 12/1995 | Tse et al. |
| 5,491,813 A | 2/1996 | Bondy et al. |
| 5,522,027 A | 5/1996 | Matsumoto et al. |
| 5,630,174 A | 5/1997 | Stone, III et al. |
| 5,675,750 A | 10/1997 | Matsumoto et al. |
| 5,701,444 A | 12/1997 | Baldwin |
| 5,712,664 A | 1/1998 | Reddy |
| 5,712,986 A | 1/1998 | Vo |
| 5,790,114 A * | 8/1998 | Geaghan et al. ............. 345/326 |
| 5,918,232 A * | 6/1999 | Pouschine et al. .......... 707/103 |
| 6,044,408 A * | 3/2000 | Engstrom et al. ........... 709/328 |

OTHER PUBLICATIONS

Michael Stein, Eric Bowman, Gregory Pierce, "Direct 3D Professional Reference", pp. 28–35, New Rider Publishing, Indianapolis, Indiana, 1997.

* cited by examiner

*Primary Examiner*—St. John Courtenay, III
*Assistant Examiner*—Van H. Nguyen

(57) ABSTRACT

A mechanism for adaptive quality performance control in three-dimensional (3D) based personal computer applications is provided. The mechanism adaptively controls multiple application programming interface (API) modes by selecting the best possible mode automatically using an aggregation function of quality and performance while, at the same time, giving the user the opportunity to change the mode through interactive control.

2 Claims, 2 Drawing Sheets

MECHANISM AND APPARATUS FOR ADAPTIVE QUALITY PERFORMANCE CONTROL IN 3D BASED PC APPLICATIONS

CROSS-REFERENCE TO RELATED APPLICATIONS

This application claims priority on provisional patent application, Ser. No. 60/068,590, entitled "Mechanism and Apparatus for Adaptive Quality Performance Control in 3D Based PC Applications," filed Dec. 23, 1997 in the names of the inventors herein and assigned to the assignee of this application.

BACKGROUND OF THE INVENTION

1. Field of the Invention

This invention relates to a mechanism for adaptive quality performance control in three-dimensional (3D) based personal computer applications, and more particularly to a mechanism for adaptively controlling multiple application programming interface (API) modes by selecting the best possible mode automatically using an aggregation function of quality and performance while, at the same time, giving the user the opportunity to change the mode through interactive control.

2. Description of the Related Art

The modern personal computer environment can be complex. For example, Windows 95 allows a user to choose multiple color depth modes (i.e., 16 colors, 256 colors, 16 bits high color, 32 bits true color), and multiple screen resolutions (640×480, 800×600, 1024×768, etc.). In addition, the different graphics' accelerators accelerate 3D rendering in only a few modes, and use only limited texture mapping capabilities for picture placement. To assist in overcoming these limitations and to address the different needs and requirements of personal computer software developers and users, modern graphics application programming interface (API) usually supports multiple modes of usage, whether or not hardware can control acceleration of rendering. For instance, Microsoft's Direct 3D API uses three separate API modes (see, Michael Stein, Eric Bowman, Gregory Pierce, Direct 3D Professional Reference, p.28–35, New Rider Publishing, Indianapolis, Ind., 1997):

- HAL (hardware abstraction layer) mode for using the capabilities of 3D hardware accelerators;
- HEL RGB (hardware emulation layer in 24-bit RGB) mode for use in quality oriented 3D software without special hardware assistance (through CPU); and
- HEL RAMP (hardware emulation layer in 8-bit color) mode for use in performance oriented 3D software without special hardware assistance (through CPU).

Various mechanisms, such as controllers and interfaces, have been proposed for improving performance in the complex personal computer environment and for providing the computer with the ability to interface with general purpose 3D rendering applications. One such mechanism, proposed in U.S. Pat. No. 5,319,388, is embodied in a VGA controller having arbitration logic to provide bus access to a frame buffer so that both the system CPU and the display controller may independently access data in the frame buffer to minimize the amount of bandwidth required. While this arrangement may improve overall system performance, it does not provide for adaptive control of multiple API modes. Another type of mechanism, described in U.S. Pat. No. 5,432,900, integrates graphical, video and audio data into a single processing environment. An integrated graphics/video controller interfaces with application software through a graphics API and a video API. However, the system does not provide a method of selecting, from several possible API modes, the mode with the maximum aggregation function of quality and performance. Yet another device, set forth in U.S. Pat. No. 5,438,663, interfaces a computer system to a high-performance graphics adapter. While the interface provides compatibility for the graphics adapter, it does not offer the adaptive API mode control using quality/performance criteria.

A mechanism has also been proposed for controlling graphics modes in a computer. In U.S. Pat. No. 5,473,342, a RAMDAC circuit drives a monitor so as to display, multiple modes of color depth and display resolution in a single display frame and adjusts the output pixel rate to match that of the display mode being displayed on a pixel-by-pixel basis. The RAMDAC circuit switches between two graphics modes on-the-fly on a pixel-by-pixel basis in accordance with mode control bits stored in the pixel data. The circuit makes efficient use of certain hardware resources to enhance the performance of the overall system but does not affect the performance of the 3D graphics application. Moreover, neither the RAMDAC circuit nor any of the other system components provide adaptive control of API modes.

Objects of the Invention

Therefore, it is an object of the present invention to overcome the aforementioned problems.

Another object of the present invention is to provide a mechanism and apparatus to adaptively control multiple API modes, to choose the best possible mode automatically, and to give the user the opportunity to change mode through interactive control.

SUMMARY OF THE INVENTION

One aspect of the invention is adapted to be embodied in a method for adaptively controlling multiple application programming interface (API) modes in a three dimensional based computer application on a computer system that supports multiple API modes of usage. The method comprises: assigning a quality value and a performance value to each of the multiple API modes and selecting one of quality and performance as a criteria; searching a mode list for the mode with a maximum aggregation function of quality and performance; determining if the mode having the maximum aggregation function is currently available for use; and automatically selecting the mode having the maximum aggregation function if it is determined to be available for use.

If it is determined that the mode having the maximum aggregation function is not available for use, then the next available mode in the mode list is selected. This mode is selected for use if it is determined to be the last mode in the mode list.

This method may be embodied in the form of software that may be stored on a computer system capable of running a three dimensional based computer application and supporting multiple API modes of usage. Such software may also be stored on a computer usable medium such as a floppy disk or CD ROM and may transferred to a suitable computer system for execution. The method may also be embodied in the form of hardware that is incorporated into an appropriately configured computer system.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
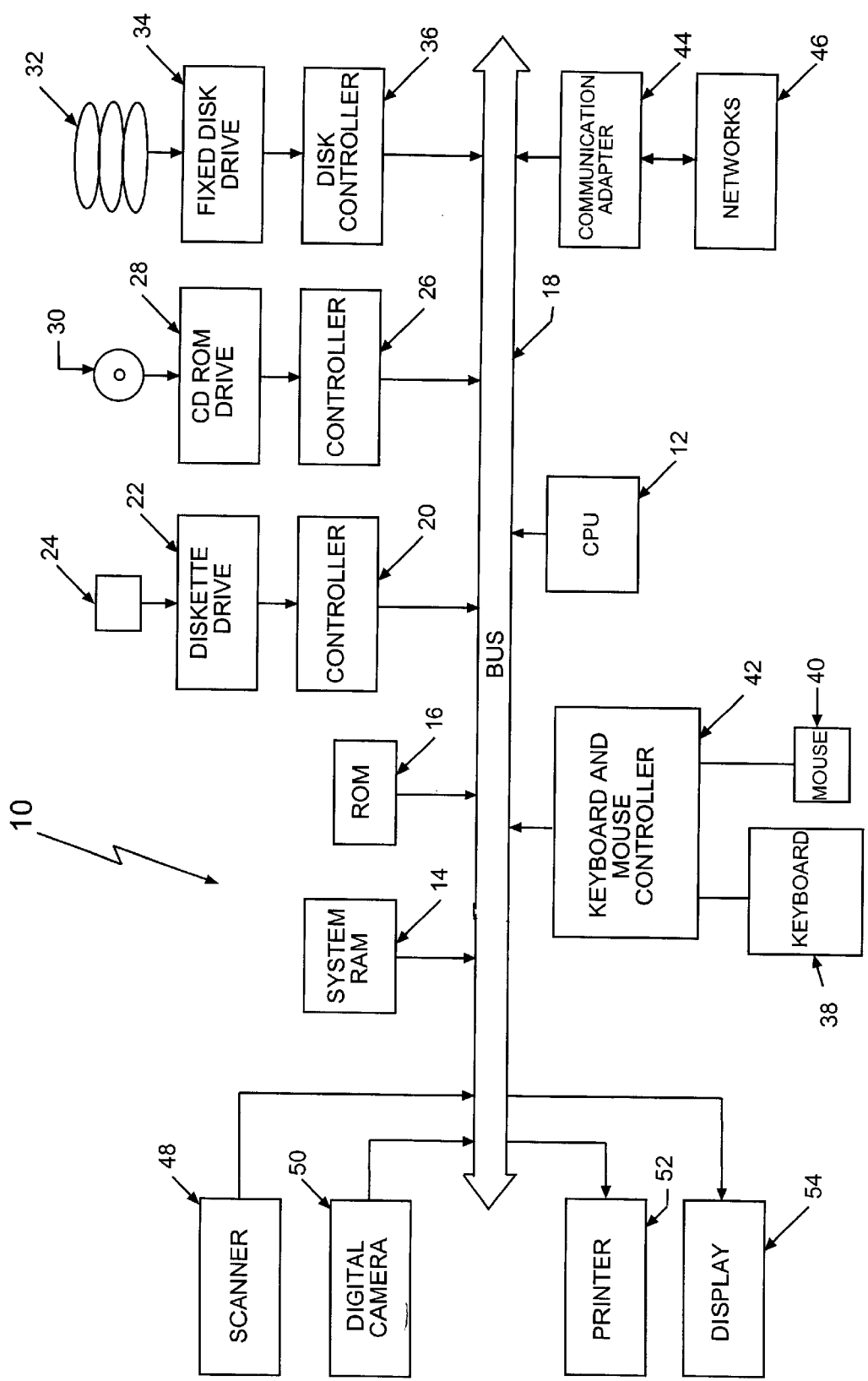
FIG. 1 is a block diagram of a computer system suitable for use with embodiments of the present invention.

Referring first to FIG. 1 of the drawings, a block diagram of a computer system on which embodiments of the invention may be implemented is shown. The computer system, identified generally by reference numeral 10, may be of any suitable type and represents a typical environment in which the invention may be practiced. By way of example, computer system 10 may be a main frame or personal computer, the latter of which may be of the IBM® compatible or Macintosh® type. Although the description may refer to terms commonly used in connection with particular computer systems, the description and concepts equally apply to other systems, including systems having different architectures from that shown in FIG. 1.

Computer system 10 comprises a central processing unit (CPU) 12 which may a conventional microprocessor, a random access memory (RAM) 14 for temporary storage of information, and a read only memory (ROM) 16 for permanent storage of information. Each of these components is coupled to a bus 18. Operation of the computer system 10 is typically controlled and coordinated by operating system software. The operating system, which is embodied in the system memory and runs on CPU 12 coordinates the operation of the other components of the computer system 10. More particularly, the operating system controls allocation of system resources and performs many tasks, such as processing, memory management, networking and I/O functions, among other things.

Also coupled to bus 18 by a controller 20 is a diskette drive 22 into which a non-volatile mass storage device such as a diskette 24 may be inserted. Similarly, a controller 26 interfaces between bus 18 and a compact disc (CD) ROM drive 28 which is adapted to receive a CD ROM 30. A hard disk 32 is provided as part of a fixed disk drive 34 which is coupled to bus 18 by a disk controller 36.

Data and software may be loaded into and extracted from computer system 10 using removable storage media devices such as the diskette 24 and CD ROM 30. Data and software may be stored in RAM 14 or ROM 16.

A keyboard 38 and mouse 40, both of which are coupled to bus 18 via a controller 42, enable a user to enter data into computer system 10. The keyboard 38 and mouse 40 also enable the user to manipulate and control computer system 10 and its components.

A communications adapter 44 enables computer system 10 to be connected to one or more networks 46 which may include the internet. This connection provides another way in which data and software may be transferred to and from computer system 10.

Data may be input into computer system 10 using various peripheral devices as well. For example, a scanner 48 may be used to scan documents containing text, image and/or graphics and convert this information into digital form for use by computer system 10. Similarly, a digital camera 50 may be used to input captured image data into computer system 10. Other peripherals such as a printer 52 may be used to render paper copies of processed computer data. Alternatively, computer data may be viewed on display 54. These peripherals 48, 50, 52 and 54 interface with the CPU 12, RAM 14 and ROM 16 via bus 18.

The adaptive quality performance control mechanism and apparatus of the present invention operates in connection with 3D-based software applications which are designed to run on computer system 10. This mechanism and apparatus is adapted to be embodied in a variety of interactive visualization systems. One such system allows a user to visualize a digital image collection, which may be personalized according to the user's desires or needs, in a 3D environment. The user may incorporate any digital picture into the system for viewing. The environment in which the image collection is viewed comprises a set of rooms, each of which is defined by walls, a ceiling, a floor and picture holders attached to the walls. The user may select how many rooms he would like to have in his viewing environment, the style of each room including the number of walls and how many picture holders he would like to apply to each wall. Even after creating a viewing environment, the user may change any of these parameters. For example, the user may later decide to add or delete rooms or change the style of the rooms. The system also provides the user with the tools to create various visual effects which may be used in navigating through the viewing rooms. An extended version of this system permits the user to interactively walk through the viewing rooms and to use multiple formats for the digital images and sound. The extended version also provides direct access to digital cameras.

Another system in which the above mechanism and apparatus may be employed is an integrated visualization framework (IVF), which is a professional tool which allows the user to load and move any 3D object, apply texture mapping, warp and/or adjust the object, and/or change the lighting. This system also allows the user to create a personal IVF "hyper-movie" using IVF script language.

Yet another system in which the above mechanism and control may be embodied is a real-time modeling system which allows the user to simulate sculpturing in real time on a personal computer. This system allows the user to choose the material from which an object is to be sculpted. Such materials may include, for example, steel, marble, granite, plastic or clay. These materials may have different starting shapes such as a sphere, a cube, a thin sheet-like shape or an irregular shape. The user may also choose the type of sculpting instrument, such as a chisel, a hammer or a hand, to be used. The user may also place texture and/or an image on top of a designed sculpture. An advanced real-time professional version of this system provides the user with the capabilities to choose an arbitrary angle at which to apply the selected sculpting instrument to the object. In addition, the advanced version permits texture binding control and provides more complex navigational capabilities.

In the present invention, each mode is described by two numeric values: mode quality (q) and mode performance (p). The system selects a function, which may be referred to as an aggregation function A(p, q), which converts numbers (q) and (p) into a final aggregate number. Any suitable aggregation function may be used including, for example, an arithmetic or geometric mean aggregation function. Criteria of selection is applied on top of A(q, p) to decide the mode priorities in the application.

Figure 2:
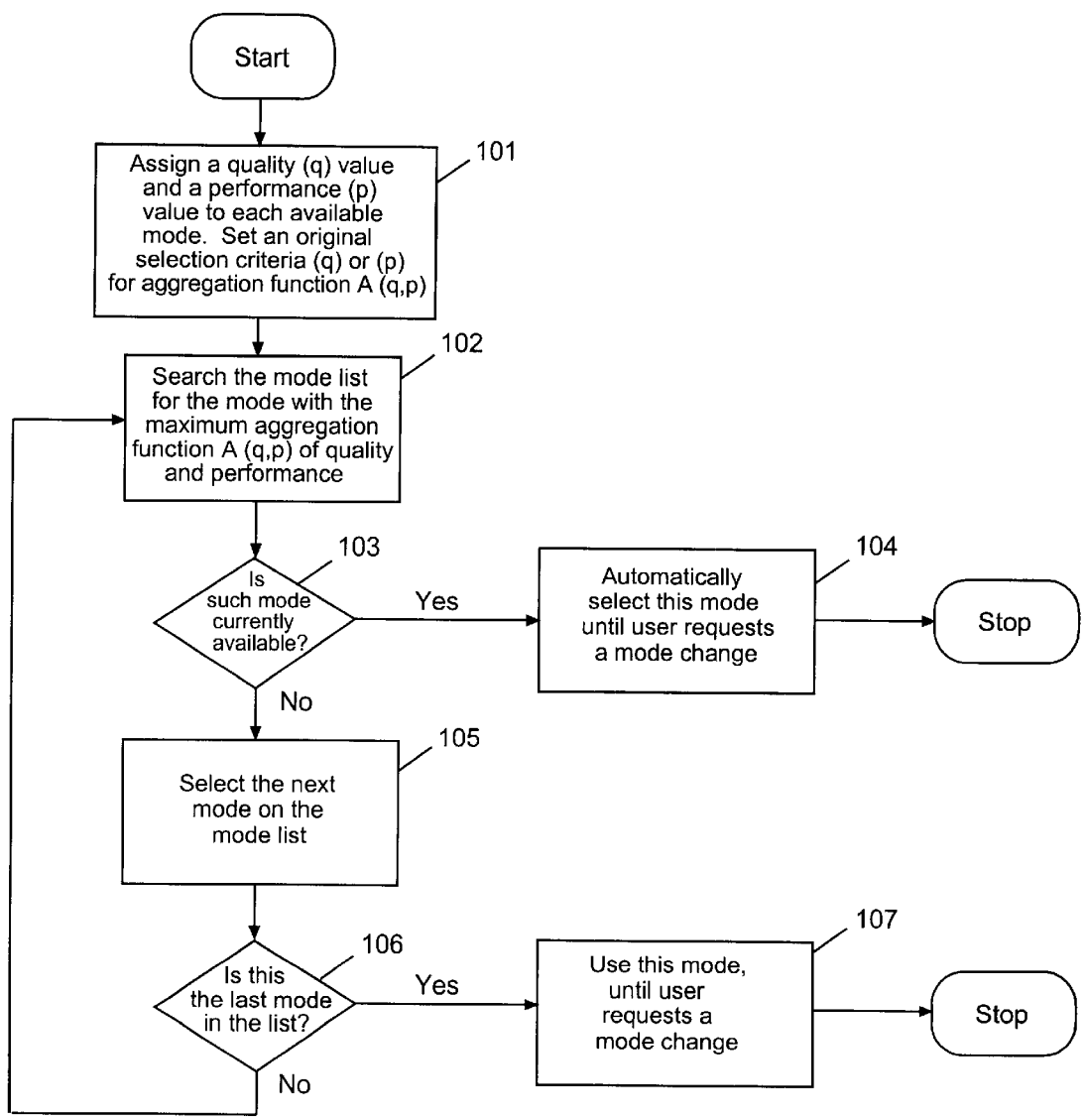
FIG. 2 is a flow diagram illustrating a design for an adaptively controlling quality and performance in 3D based applications in accordance with the invention.

FIG. 2 illustrates the underlying algorithm of one possible design using a flow chart. It should be noted that this flow chart depicts the performance of certain specified functions and relationships thereof. The boundaries of these functional blocks have been arbitrarily defined herein for the convenience of description. Alternate boundaries may be defined so long as the specified functions and relationships thereof are appropriately formed. Moreover, the flow diagram does not depict syntax or any particular programming language. Rather, it illustrates the functional information one skilled in the art would require to fabricate circuits or to generate software to perform the processing required. Each of the functions depicted in the flow diagram may be implemented, for example, by software instructions, an application specific integrated circuit (ASIC) or combination thereof.

Referring now to FIG. 2, the algorithm begins by assigning a quality (q) value and a performance (p) value to each available mode and setting an original criteria of selection (q) or (p) in step 101. Next, in step 102, the algorithm searches the mode list for the mode with the maximum aggregation function A(q, p) of quality and performance. It is then determined in step 103 if this mode is currently available. If so, this mode is automatically selected in step 104, until the user requests a mode change. If not, the algorithm proceeds to step 105 where the next mode on the mode list is selected. If it is determined in step 106 that this is the last mode in the list, then this mode is used in step 107, at least until the user requests a mode change. If this is not the last mode in the list, as determined in step 106, then the algorithm returns to step 102.

Example 1, set forth below, describes a practical realization of the design illustrated in FIG. 2.

EXAMPLE 1

The technology is implemented with Microsoft Direct 3D API. We assigned values (1, 1) for (q) and (p) in a HAL mode, values (0.5, 1) to HEL RAMP mode, and values (1, 0.2) to the HEL RGB mode. We use as a criteria of selection a maximum sum of (q) and (p) values. Based on this criteria, HAL is selected as a first priority criteria. If HAL is not available as a mode, which means that the hardware does not accelerate 3D, our application starts in HEL RAMP mode. The user can override the automatic control mode selection using a menu to switch between all available modes, based on the user's requirements and/or personal taste. This provides the system with increased flexibility.

While the invention has been described in conjunction with specific embodiments, it will be evident to those skilled in the art in light of the foregoing description that many further alternatives, modifications and variations are possible. Thus, the invention described herein is intended to embrace all such alternatives, modifications, applications and variations as may fall within the spirit and scope of the appended claims.

What is claimed is:

1. A method for adaptively controlling multiple application programming interface (API) modes in a three dimensional based computer application on a computer system supporting multiple API modes of usage, comprising the steps of assigning a quality value and a performance value to each of the multiple API modes and selecting one of quality and performance as a criteria;

searching a mode list for the mode having a maximum aggregation function of quality and performance; and determining if the mode having the maximum aggregation function is currently available for use, and if so, automatically selecting that mode for use, and if not, selecting the next mode in the mode list, and determining if the next mode is the last mode in the mode list, and if so, selecting that mode for use, and if not, returning to the searching step so as to enhance the performance of the three dimensional based computer application.

2. A computer system supporting multiple application programming interface (API) modes of usage for running a three dimensional based computer application, comprising:

instructions for assigning a quality value and a performance value to each of the multiple API modes and selecting one of quality and performance as a criteria;

instructions for searching a mode list for the mode having a maximum aggregation function of quality and performance; and instructions for determining if the mode having the maximum aggregation function is currently available for use, and if so, automatically selecting that mode for use, and if not, selecting the next mode in the mode list, and determining if the next mode is the last mode in the mode list, and if so, selecting that mode for use, and if not, returning to the searching step so as to enhance the performance of the three dimensional based computer application.

\* \* \* \* \*